United States Patent [19]

Pecoraro

[11] 4,099,950

[45] Jul. 11, 1978

[54] GLASS RIBBON APPARATUS WITH TWEEL EMPLOYING GLASSY SILICA GLASS CONTACT REFRACTORY

[75] Inventor: George A. Pecoraro, Lower Burrell, Pa.

[73] Assignee: PPG Industries, Inc., Pittsburgh, Pa.

[21] Appl. No.: 821,671

[22] Filed: Aug. 4, 1977

[51] Int. Cl.² .............................................. C03B 18/02
[52] U.S. Cl. .................................. 65/99 A; 65/182 R; 65/345; 65/374 R
[58] Field of Search ............... 65/65 A, 99 A, 182 R, 65/345, 374 R

[56] References Cited

U.S. PATENT DOCUMENTS

| 3,486,876 | 12/1969 | Augustin et al. ................ 65/64 A X |
| 3,492,107 | 1/1970 | Simpson et al. ................ 65/65 A X |
| 3,884,665 | 5/1975 | Edge et al. ........................ 65/99 A |

*Primary Examiner*—Arthur D. Kellogg
*Attorney, Agent, or Firm*—E. Kears Pollock

[57] ABSTRACT

A float glass forming facility employing a composite tweel and a wetback refractory piece, each having glass contact portions made of a glassy silica such as clear fused quartz, provides for the manufacture of glass which is substantially free of any fine seeds attributable to glass-refractory contact.

5 Claims, 2 Drawing Figures

4,099,950

GLASS RIBBON APPARATUS WITH TWEEL EMPLOYING GLASSY SILICA GLASS CONTACT REFRACTORY

BACKGROUND OF THE INVENTION

1. Field of the Invention

The present invention relates to apparatus for the manufacture of flat glass wherein the glass is formed while being supported on a surface of a pool of molten metal following delivery thereto as molten glass flowing from a glass melting, refining and conditioning furnace. More particularly, this invention relates to a combination of elements providing an improved means for delivering molten glass at a controlled rate from a glassmaking furnace and for initially establishing a body of molten glass on the surface of a pool of molten metal in a forming chamber.

2. Brief Description of the Prior Art

It is well known that molten glass can be delivered onto molten metal and formed into a continuous ribbon or sheet of glass. In accordance with the teachings of Pilkington U.S. Pat. No. 3,220,816, it is disclosed that a suitable method for delivering molten glass onto a surface of molten metal for forming is to direct the flow of molten glass over a spout or lip extending over and above a pool of molten metal and to allow the molten glass to fall freely from the lip onto the surface of the pool of molten metal to form a body of molten glass thereon by spreading laterally and flowing both rearwardly and forwardly from the point at which it is poured onto the molten metal. In such a delivery system it is common to provide a refractory element known as a wetback block which is contacted by the rearwardly flowing portion of the delivered body of molten glass and which serves to divert and direct the rearwardly flowing portion of molten glass outwardly so that it may join the forwardly flowing portion of the body of molten glass along its marginal regions.

U.S. Pat. No. 3,508,902 illustrates a molten glass delivery system along with the inlet end of a glass forming chamber employing a wetback block for engaging a rearwardly flowing portion of a delivered stream or body of molten glass.

Molten glass delivery systems typically employ metering members which are used to control the rate of molten glass flow to the forming chambers associated with them. Typically, a metering member is a refractory gate or tweel which may be translatably adjusted in a molten glass flow channel. Such a metering member acts as a gate valve to control the flow of molten glass through the channel. As illustrated in U.S. Pat. No. 3,445,217, a metering member may be a composite tweel employing two different refractories. One refractory may be selected as a wear-resistant refractory as shown in this patent with the wear-resistant refractory serving as the lower glass-contacting portion of the tweel, and as illustrated in this patent, the upper portion of the tweel may comprise a refractory material selected for its resistance to thermal shock and its mechanical strength.

U.S. Pat. No. 3,445,217 suggests the use of prefired fire clay or prefired clay bonded calcined kyanite or sillimanite as the upper portion of a tweel and suggests that the lower portion of a tweel be a wear-resistant refractory material such as fused cast zirconia, alumina or corundum material.

From time to time in the operation of a glass forming facility, the glass produced develops slight defects which, while not readily apparent to the naked eye, are nevertheless undesirable in the glass. These defects include extremely fine bubbles or seeds in the bottom surface of the glass, particularly in its marginal portions which are attributed to contamination along the wetback region of such a facility. Defects also include fine lines in the top surface of glass, which lines have been attributed to the non-uniform wear of tweels. Such non-uniform wear has, in turn, been attributed to inhomogeneities in the refractory material from which glass-contacting portions of tweels have been fabricated. In accordance with the present invention, the glass-contact portion of a tweel and the wetback block of a glass forming facility are made of material which is less susceptible of causing such defects.

SUMMARY OF THE INVENTION

A glassmaking apparatus comprising a glassmaking furnace and a glass forming chamber joined through a facility for delivering molten glass from the furnace to the forming chamber which includes a glass-supporting member and side members forming a flow channel for the molten glass is provided with a composite tweel which extends transversely across the channel to meter the flow of molten glass through it. The composite tweel has a lower, glass-contacting portion of a substantially glassy silica material. The entire tweel may be made of such a material, but it is preferred that the tweel be a composite tweel and that its upper portion be made of a conventional material such as sillimanite or rebonded fused cast silica such as the material sold by Harbison-Walker Refractories as Masrock refractory.

The lower, glass-contacting portion of the tweel is preferably a clear fused quartz. Further, the preferred clear fused quartz preferably has a polished glass-contacting surface which may be acid-etched as a final polishing step. When the apparatus employs a composite tweel, the lower portion of the tweel is preferably connected to the upper portion of the tweel with an interface between them that is at an elevation to be substantially immediately below the intended glass surface on the upstream or furnace side of the tweel and substantially immediately above the glass surface on its downstream side facing the glass forming chamber. Thus, the interface between an upper and lower portion of the preferred composite tweel is either a step or a slope when viewing a cross-sectional elevation of the tweel in a plane parallel to the intended direction of glass flow from the furnace to the forming chamber.

A preferred composite tweel has its lower portion connected to its upper portion by a series of refractory pins extending through matching holes in each of the portions of the tweel. Preferably, no cement is employed at the interfacial joint between the upper and lower portions of the tweel. Instead, the interfacial joint is sealed by the glass itself since the upstream face of the tweel has the interface between the upper and lower portions of the tweel just below the surface of the molten glass as previously indicated. Preferred rods or pins for connecting the upper and lower portions of the tweel are rods or pins of the same material as the lower portion of the tweel.

In an apparatus for making glass which employs a substantially horizontal delivery system wherein molten glass is fully supported as it is delivered directly onto the surface of molten metal for forming, there is no wetback block; yet, as indicated in copending commonly assigned U.S. patent application Ser. No. 692,155 of Tilton, the preferred refractory material for contacting the molten metal at the point of molten glass delivery thereto, is a glassy material such as clear fused quartz. However, in an apparatus employing a glass delivery facility such as illustrated in U.S. Pat. No. 3,445,217, a wetback region does exist beneath the spout of the molten glass delivery facility. Thus, the present invention also contemplates employing a substantially glassy silica refractory material as a wetback block in such an apparatus. In such an apparatus the preferred wetback block is fabricated of clear fused quartz.

DETAILED DESCRIPTION OF THE INVENTION

Figure 1:
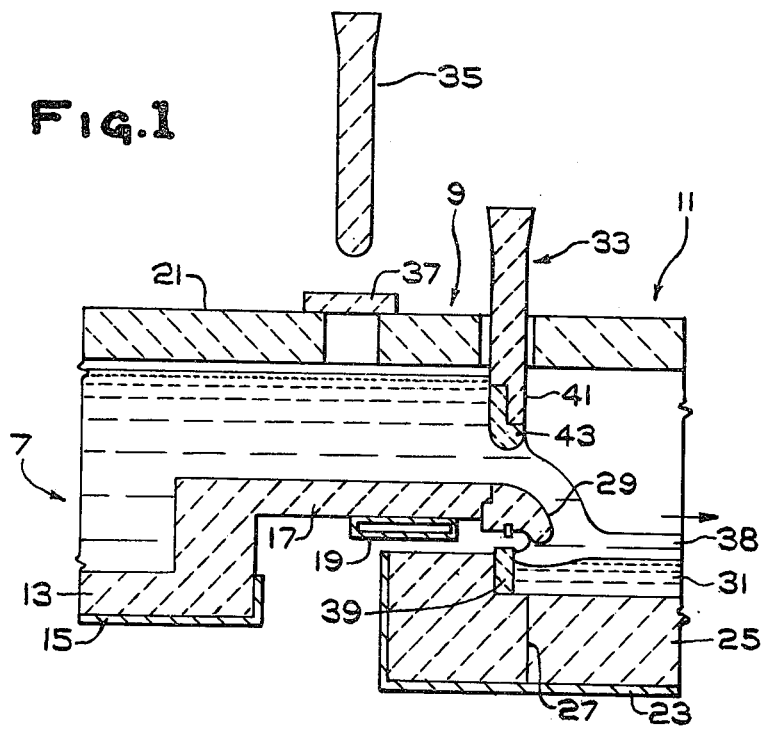
FIG. 1 is a partial cross-sectional longitudinal elevation of a glassmaking apparatus illustrating a molten glass delivery facility, the downstream or exit end of a glassmaking furnace to which it is joined and the upstream or inlet end of the glass forming chamber or bath to which it delivers molten glass for forming.
Figure 2:
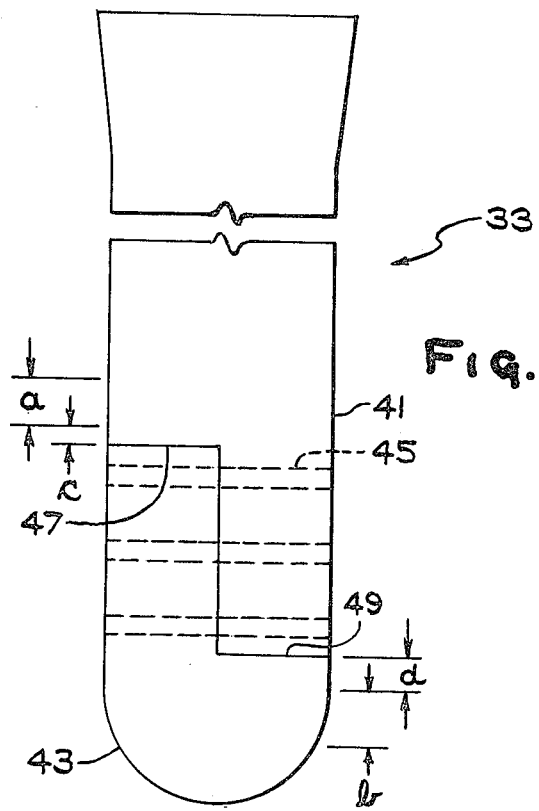
FIG. 2 illustrates in a cross-sectional longitudinal elevation an enlarged and detailed view of the composite tweel employed in the apparatus shown in FIG. 1.

Referring now to FIGS. 1 and 2, there is illustrated a glassmaking furnace 7 terminating in a refiner or conditioner which is connected through a molten glass delivery facility 9 to a glass forming chamber or bath 11.

The glassmaking furnace 7 includes a furnace bottom 13 and may include a furnace casing 15. The molten glass delivery facility 9 includes a canal bottom 17 which may be mounted on a cooler 19. Extending over the extreme downstream end of the glassmaking furnace 7 and over the canal of the delivery facility 9 is a roof or flat arch 21. The glass forming chamber 11 includes a bottom casing 23 having disposed within it a refractory bottom liner 25 and refractory side walls and end wall 27 which, together with an exit lip (not shown), form a container. The molten glass delivery facility further includes a spout or lip 29 mounted above and extending over this container. Within the container there is disposed a pool of molten metal 31, preferably molten tin or an alloy thereof. The molten glass delivery facility 9 further includes a metering gate or tweel 33 which is mounted to permit its upward and downward movement to control the size of the opening between the tweel 33 and the spout 29 and control the control rate of molten glass flow therethrough. A backup or emergency tweel 35 is also provided which may be extended at times through an opening in the flat arch 21 in order to control the flow of molten glass in the event that maintenance is required on the operating tweel 33 or to close off the flow of molten glass entirely in order to permit maintenance of the spout or lip 29. When the backup tweel 35 is not in use, the opening for it in the flat arch 21 is covered by a cover plate 37.

Molten glass 38 flows along the canal and between the operating tweel 33 and the spout or lip 29 onto the pool of molten metal 31 and forms a buoyant body of molten glass on the pool of molten metal during operation. As it flows onto the pool of molten metal 31 from the lip 29, it divides into forwardly and rearwardly flowing portions. The rearwardly flowing portion approaches and generally engages a wetback block 39, which in accordance with this invention is a glassy silica material, preferably clear fused quartz. This molten glass in the rearwardly flowing stream then flows outwardly toward the sides of the forming chamber and rejoins the forwardly flowing portion of molten glass along its marginal regions. By employing a material such as clear fused quartz as a wetback block, the propensity for developing fine seeds or bubbles in these marginal portions of the glass is reduced.

The operating tweel 33 includes an upper part 41 and a lower portion 43 of substantially glassy silica, preferably clear fused quartz. The upper and lower portions of the tweel 41 and 43 are joined together by a series of pins 45, which extend through them. As shown in the preferred embodiment of the composite tweel illustrated in FIG. 2, the interface between the upper and lower portions of the tweel is a stepped interface with the interface between the upper and lower portions along the upstream face of the tweel (that is, the left face in FIGS. 1 and 2 which faces the glassmaking furnace) slightly below the surface of the molten glass which contacts and engages the upstream face of the tweel. Meanwhile, the interface between the upper and lower portions of the tweel along its downstream face (that is, the right face in FIGS. 1 and 2 which faces the bath or forming chamber) is at an elevation to be slightly above the glass-tweel interface during operation.

As shown in FIG. 2, the space designated "a" is the elevational range over which the upstream glass surface line is to be permitted to vary as the tweel is moved upwardly and downwardly to control the rate of flow of molten glass to the forming chamber. The space designated "b" is the range over which the glass surface-tweel intersection is to be permitted to vary during upward and downward adjustment of the tweel position. The space indicated "c" is the minimum tolerance for the glass surface to the interface on the upstream face of the tweel and is preferably from one-quarter to one-half inch. The space indicated "d" is the minimum tolerance for the glass surface to the downstream face interface and is preferably from one-fourth to one-half inch (0.62 - 1.25 cm).

The composite tweel is preferably constructed with no cement in the upstream interface region 47, and this space is to be sealed by the glass as the composite tweel is placed in operation. For a tweel having a 40-inch width, nine to 12 clear fused quartz pins 45 are sufficient for connecting the upper and lower portions of the tweel together. The pins may be cemented to the upper portion of the tweel and cement may be employed along the pins in the vicinity of the interface between the portions of the tweel near the center of the tweel; however, it is preferred that no cement be employed about the pins adjacent the upstream face of the composite tweel. Even though a glassy silica material such as clear fused quartz is subject to noticeable wear by soda-lime-silica glass, such as that typically formed into flat glass, the use of such a glassy silica material as a glass contact refractory in a molten glass delivery facility, is found to be advantageous. While the glass contact refractory portion of the tweel just described may be subject to wear by the molten glass, the wear is relatively uniform and because of the compatibility of silica with typical lime-soda-silica glasses, there is no apparent non-uniform reaction along the surface of glass delivered in contact with such material to a forming process. Therefore, despite wear, glass produced following contact by a glassy silica material is free of lines or other discrete defects.

While this invention has been described with reference to particularly preferred embodiments thereof, those skilled in the art of flat glass manufacture will appreciate that variations may be made from the specific embodiments disclosed herein without departing from the spirit and scope of this invention as defined in the following claims.

I claim:

1. In a glassmaking apparatus comprising a glassmaking furnace and a glass forming chamber joined through a molten glass delivery means having a molten glass-supporting member and side members forming a glass flow channel and a tweel extending transversely across the channel for metering the flow of molten glass therethrough, the improvement which comprises a composite tweel having a lower, glass-contacting portion of a substantially glassy silica wherein the lower, glass-contacting portion of the tweel is connected to an upper portion of the tweel of thermal shock-resistant refractory material along an interface which is substantially immediately below a first intended glass surface intersection on an upstream face facing the glassmaking furnace and substantially immediately above a lower second intended glass surface intersection on a downstream face facing the glass forming chamber which second intersection is at a location below the intersection between the interface and the upstream face of the tweel.

2. The apparatus according to claim 1 wherein the lower, glass-contacting portion of the tweel is a clear fused quartz.

3. The apparatus according to claim 2 wherein the lower, glass-contacting clear fused quartz portion of the tweel has a polished glass-contacting surface.

4. The apparatus according to claim 1 wherein the molten glass-supporting member of the glassmaking apparatus terminates in a lip spaced above a glass-supporting pool of molten metal in the forming chamber and the forming chamber includes an end wall portion beneath the lip and spaced toward the glassmaking furnace from it, which wall portion includes a wetback block for contact by molten glass during its initial delivery onto the molten metal, and wherein the apparatus further comprises the improvement of a wetback block of substantially glassy silica.

5. The apparatus according to claim 4 wherein the wetback block is a clear fused quartz.

* * * * *